United States Patent Office 3,396,093
Patented Aug. 6, 1968

3,396,093
ELECTROCHEMICAL SYNTHESIS OF KETONES
William J. Koehl, Jr., Yardley, Pa., assignor to Mobil Oil Corporation, a corporation of New York
No Drawing. Filed July 2, 1965, Ser. No. 469,322
8 Claims. (Cl. 204—59)

This invention relates to the electrochemical synthesis of 1,2-diketones and 1,2-hydroxyketones from acetylene compounds. It provides not only a new synthesis of such products but also a more convenient and direct method of preparing them. By comparison, most conventional chemical methods start with a monoketone and proceed to oxidize the same, frequently requiring a plurality of chemical steps.

The invention has the further advantage of being flexible; thus, by using water in the mixture to be electrolyzed, a hydroxyketone is formed; and by omitting the water, a diketone precursor is formed which is readily hydrolyzed to the diketone.

The products are of value as intermediates in organic syntheses; in particular, the diketones tend to be quite reactive, owing to the adjacent carbonyl groups, and similarly, the hydroxyketones are also reactive because of the adjacent hydroxy and carbonyl groups. The lower boiling products are useful solvents, particularly for polymer materials. Some of the products have particular uses, thus biacetyl and other aliphatic diketones can remove odors from dairy products. Certain diketones are polymerization catalysts. Biacetyl is further useful as a preservative, a bactericide, and as a flavor- and aroma-imparting agent. Benzil is of value as an insecticide and insect repellant.

In brief, the new method comprises electrolyzing a mixture comprising an acetylene compound, an alkanoic acid, an alkali metal salt of an alkanoic acid, and an ingredient which may be water or an acid anhydride and whose selection determines whether a hydroxyketone or a diketone is the major product. When the choice is water, a hydroxyketone is directly formed and may be recovered, and when the choice is the anhydride, so that the mixture is anhydrous, a diketone precursor is directly formed and may be hydrolyzed to the diketone.

In more detail, the acetylene compound may be defined as $RC{\equiv}CR'$, where R and R' are hydrogen, alkyl, aryl, aralkyl, alkoxy, aryloxy, and aralkoxy. Both R and R' may be the same radical, as is preferred, or R may be one radical while R' is another. For example, R may be phenyl while R' is methyl, or R may be ethyl while R' is methyl. Illustrative acetylene compounds include aliphatic compounds like acetylene itself, propyne, 1- and 2-butyne, 1- and 2-pentyne, 3-methylbutyne-1, 1-, 2-, and 3-hexyne, 1-, 2-, and 3-heptyne, 1- and 2-octyne, 1-decyne, 1-dodecyne, and the like; also aryl-substituted acetylenes like phenyl- and diphenylacetylene; alkoxy acetylenes like diethoxyacetylene; aryloxy acetylenes like diphenoxyacetylene; aralkylacetylenes like 4,4′-dimethyldiphenylacetylene; and aralkoxyacetylenes like 4,4′-dimethoxydiphenylacetylene. It will be understood that the term "acetylene compound" is intended to include both acetylene and substituted acetylenes, in accordance with the foregoing line formula.

Suitable alkanoic acids are the C–2 to C–10 acids, and preferably the C–2 to C–6 acids such as acetic, propionic, butanoic and pentanoic and their isomers, and the various hexanoic acids. Branched as well as straight chain acids are useful.

The alkali metal salt of the acid is preferably a salt of the acid that is present and preferably too is the sodium or potassium salt, although lithium and quaternary ammonium salts are suitable. It will be understood that the salt may be added per se to the solution or formed in situ as by addition of a base like KOH, NaOH, etc. and reaction of the latter with part of the free acid.

The acid anhydride, when used, is preferably that of the alkanoic acid which is present. As indicated, the anhydride-containing solution to be electrolyzed is an anhydrous one, and the anhydride helps maintain the anhydrous state of the solution. Use of the anhydride in this way is convenient, but it may be omitted if all of the other materials are initially anhydrous. The acid and the anhydride are usually liquid and together function as the solvent in which the other components are dissolved. If the anhydride is omitted, the acid alone functions as the solvent; in some cases the solvent may comprise the acid and an added component like acetonitrile. Whatever its composition, the solvent should have suitable solvent action and a suitable dielectric constant. The acid, it should be noted, also takes part in the reaction.

The composition of the solution to be electrolyzed may be indicated in terms of broad and preferred ranges as follows:

|  | Broad, g./l. | Preferred, g./l. |
| --- | --- | --- |
| Acetylene compound | 1–500 | 25–150 |
| Alkanoic acid | 10–800 | 300–800 |
| Alkanoic acid salt | 20–500 | 50–150 |
| Anhydride | 100–500 | 300–500 |
| Water | 100–300 | 100–200 |

It will be understood that when the solution is to be anhydrous, no water is used, and when it is not anhydrous, no anhydride is used.

The current density may be maintained over a fairly wide range, say 0.001 to 0.5, and preferably 0.01 to 0.25, amp./sq. cm. It determines the rate or speed of the electrolysis. Applied voltage is supplied by any suitable DC source.

Room temperatures are preferred, e.g., 20 to 30° C., although higher temperatures are useful, going to the boiling point of the solution. The current efficiencies are in the range of 10 to 50%. If desired, a diaphragm of conventional material may be used to separate the cathode from the anode in order to prevent possible reaction of the products formed at one electrode with those at the other. Agitation is desirable but can be omitted. The pH of the electrolyte solution may initially be on the acid side, as is preferable, or it may be neutral, and suitably may range from a pH of 4 to 6, more broadly from 2 to 7.

The preferred anodes are platinum, carbon and lead dioxide, although other anodes are useful. The cathode may be carbon or graphite or any inert metal such as copper, stainless steel, platinum, silver, nickel, lead, etc. Forms of the electrodes are conventional.

The foregoing conditions of current density, applied voltage, temperature, current efficiency, pH, and choice of electrodes are applicable to the electrolysis of both aqueous and anhydrous solutions.

The product or products are formed at the anode by anodic oxidation. The anolyte may be distilled or fractionated to recover the product, or it may be worked up by crystallization techniques. In the case of water-insoluble reaction products, such as benzil, another suitable work-up procedure comprises extracting the anolyte with water to take up water solubles, separating the mixture, then extracting the resulting product-containing water-insoluble fraction with a conventional solvent, such as ether or ethanol, to take up the product, and recovering the latter by crystallization or distillation. Where the reaction product is water soluble, as in the case of biacetyl, the anolyte may be extracted with ether to take up the product, and the latter recovered by crystallization or distillation; including steam distillation in the case of a steam-volatile compound like biacetyl.

Products synthesizable by the described method include benzil and benzoin, obtainable from diphenylacetylene; thus, as illustrated in Examples 1 and 2, benzil is obtainable when the electrolyzed mixture is anhydrous, and benzoin is obtainable when the mixture is aqueous. The benzil, it should be noted, appears in the electrolysis mixture as an acylated precursor and may be recovered by conventional acid or alkaline hydrolysis thereof either prior to or after removal from the mixture. Acid hydrolysis is suitably performed in alcoholic solutions, and alkaline hydrolysis in, say, a weak KOH solution, both steps carried out at refluxing temperatures. Other illustrative products include 2,3-pentanedione and 2-hydroxy-3-pentanone from 2-pentyne; biacetyl and acetoin from 2-butyne; 4,4'-dimethoxybenzil (anisil) and 4,4'-dimethoxybenzoin from 4,4'-dimethoxydiphenylacetylene; bipropionyl and 3-hydroxy-4-hexanone from 3-hexyne, etc. As is apparent, the products are all 1, 2 isomers or alpha-diketones. Still other products that may be synthesized are 4-methyl-2,3-pentanedione, 3,4-heptanedione, 4,5-octanedione, acetyl benzoyl, furil, etc.

The invention may be illustrated by the following examples.

Example 1

An electrolysis mixture was prepared comprising 4.9 g. diphenylacetylene, 9.0 g. sodium acetate, 60 ml. glacial acetic acid, and 60 ml. acetic anhydride. The charge was placed in a cell comprising a 3.0 cm. diameter glass cylinder fitted with a reflux condenser, thermometer, magnetic stirrer, an anode comprising a carbon rod of 0.25 in. diameter, and a cathode in the form of a gauze cylinder of platinum. The mixture was electrolyzed for 6 hours at 60° C. using 18 volts applied voltage at 0.5 ampere. The resulting reaction mixture was added to water to dissolve water solubles, the mixture separated, and the water insolubles fraction, comprising unreacted feed and an acetylated reaction product, was subjected to hydrolysis by dissolving in a mixture of ethanol and dilute hydrochloric acid and heating to boiling for about 20 mins. The product of hydrolysis was benzil, which was recovered by crystallization from ethanol. It was identified by its infrared spectrum and by gas chromatography, in both cases a comparison with the known compound being used. The yield, based on diphenylacetylene consumed, was 81% by weight, and on the basis of current, it was 26%.

Example 2

A mixture of 4.9 g. diphenylacetylene, 12 g. sodium acetate, 100 ml. acetic acid, and 40 ml. water was charged to the cell of Example 1 and electrolyzed for 6.3 hours at a temperature of 40–70° C. using 8–18 volts at 1.0 ampere. At the end of the electrolysis, the reaction mixture was added to water, and the resulting mixture extracted with ether, the latter dissolving the product. The amount of product was 5.5 g. which, when analyzed by gas chromatography, was found to comprise 73% diphenylacetylene and 20% of benzoin, the latter including a small amount of benzil precursor. From this fraction, benzoin was separated by crystallization; it was the major reaction product and was obtained in a yield of 62% by weight, based on the diphenylacetylene converted, or 7% based on the current. Infrared spectrum analysis showed that the benzil precursor was the same as that in the preceding example. The amount of precursor was 10 to 20% of the amount of benzoin.

Example 3

Into the same cell as used in Example 1, there was charged a mixture of 15 ml. 2-pentyne, 20 g. potassium acetate, 80 ml. acetic acid, and 40 ml. acetic anhydride. This anhydrous mixture was electrolyzed for 28.5 hours at 25–35° C. using 10–20 volts at 0.5 ampere. Although conversion was low, a product was isolated from the reaction mixture by preparative scale gas chromatography which had an infrared spectrum of an acetylated reaction product. After hydrolysis in dilute HCl solution, 2,3-pentanedione was recovered as the diketone product and its identity established by conversion to a derivative of 2,4-dinitrophenylhydrazone.

As may be seen from the foregoing examples, acetic acid is one of the components of the electrolysis mixture, and it is apparent that a reaction product precursor is formed comprising an acetylated derivative of the starting acetylene compound. The precursor is formed in both anhydrous and aqueous mixtures, but apparently the former leads to a greater quantity; and on subsequent hydrolysis it is converted to a diketone. If desired, instead of converting the acetylated derivative to diketone by hydrolysis, it may be recovered from the anolyte by extraction with a suitable solvent such as ether.

It will be understood that the invention is capable of obvious variations without departing from its scope.

In the light of the foregoing description, the following is claimed.

I claim:

1. Method of converting an acetylene compound of the formula, $RC \equiv CR'$, where R and R' may be hydrogen, alkyl, aryl, aralkyl, alkoxy, aryloxy, and aralkoxy to a ketone product selected from 1,2-diketones of the formula, $RCOCOR'$, and 1,2-hydroxyketones of the formula, $RCHOHCOR'$, where R and R' are the same as before, which comprises electrolyzing a mixture comprising said acetylene compound, an alkanoic acid, an alkali metal salt of an alkanoic acid, and a compound selected from an alkanoic acid anhydride and water, carrying out said electrolysis at a temperature below the boiling point of said mixture, forming an acylated diketone precursor in the presence of said anhydride and forming said hydroxyketone in the presence of water, and hydrolyzing said precursor to form said diketone.

2. Method of claim 1 wherein said acetylene compound is a dialkylacetylene.

3. Method of claim 1 wherein said acetylene compound is a diarylacetylene.

4. Method of claim 1 wherein said acetylene compound is a diarlkylacetylene.

5. Method of claim 1 wherein said acetylene compound is acetylene.

6. Method of claim 1 wherein said acetylene compound is a dialkoxyacetylene.

7. Method of converting an acetylene compound of the formula $RC \equiv CR'$, where R and R' may be hydrogen, alkyl, aryl, aralkyl, alkoxy, aryloxy, and aralkoxy, to a 1,2-diketone of the formula, $RCOCOR'$, where R and R' may be the same as before, which comprises electrolyzing an anhydrous mixture of said acetylene compound, an alkanoic acid, an alkali metal salt of said acid, and the anhydride of said acid, forming a reaction mixture comprising acylated precursor of said diketone, separating said precursor and subjecting the same to hydrolysis to form said diketone, and recovering the latter.

8. Method of converting an acetylene compound of the formula, $RC \equiv CR'$, where R and R' may be hydrogen, alkyl, aryl, aralkyl, alkoxy, aryloxy, and aralkoxy, to a 1,2-hydroxyketone of the formula, $RCHOHCOR'$, where R and R' are the same as before, which comprises electrolyzing an aqueous mixture comprising said acetylene compound, an alkanoic acid, an alkali metal salt of said acid, and water at a temperature below the boiling point of said mixture, thereby forming said hydroxyketone, and recovering said hydroxyketone.

References Cited

UNITED STATES PATENTS

| | | | |
|---|---|---|---|
| 1,159,376 | 11/1915 | Hansen et al. | 204—80 |
| 1,365,053 | 1/1921 | Ellis et al. | 204—80 |
| 3,147,203 | 9/1964 | Klass | 204—80 |

JOHN H. MACK, *Primary Examiner.*

H. M. FLOURNOY, *Assistant Examiner.*